(12) United States Patent
Wahler et al.

(10) Patent No.: US 7,659,687 B2
(45) Date of Patent: Feb. 9, 2010

(54) INTELLIGENT DRIVE

(75) Inventors: Matthias Wahler, Muedesheim (DE);
Christian Feistel, Gemuenden (DE);
Alexander Schmitt, Dettelbach (DE)

(73) Assignee: Bosch Rexroth AG, Stuttgart (DE)

( * ) Notice: Subject to any disclaimer, the term of this patent is extended or adjusted under 35 U.S.C. 154(b) by 407 days.

(21) Appl. No.: 11/570,193

(22) PCT Filed: Jun. 10, 2005

(86) PCT No.: PCT/EP2005/006254

§ 371 (c)(1),
(2), (4) Date: Dec. 7, 2006

(87) PCT Pub. No.: WO2005/124488

PCT Pub. Date: Dec. 29, 2005

(65) Prior Publication Data

US 2007/0182359 A1    Aug. 9, 2007

(30) Foreign Application Priority Data

Jun. 22, 2004  (DE) ................ 10 2004 030 076

(51) Int. Cl.
*H02P 8/34* (2006.01)
(52) U.S. Cl. ................ 318/806; 702/56; 702/182; 702/183
(58) Field of Classification Search ............. 714/25, 714/100; 340/635, 679, 853.2; 702/59, 77, 702/127, 188, 182, 56, 183; 398/9; 318/565, 318/128, 727, 806
See application file for complete search history.

(56) References Cited

U.S. PATENT DOCUMENTS

| 4,527,214 | A |   | 7/1985 | Hattori et al. |
| 5,214,559 | A |   | 5/1993 | Zerbian et al. |
| 5,357,611 | A |   | 10/1994 | Kaneshima |
| 5,528,446 | A | * | 6/1996 | Sankaran et al. ............ 361/25 |
| 5,680,025 | A |   | 10/1997 | Bowers, III et al. |
| 5,739,698 | A | * | 4/1998 | Bowers et al. ............ 324/772 |
| 5,896,257 | A |   | 4/1999 | Takahashi et al. |
| 5,922,963 | A | * | 7/1999 | Piety et al. ............... 73/659 |
| 6,017,192 | A |   | 1/2000 | Clack et al. |
| 6,041,287 | A | * | 3/2000 | Dister et al. ............. 702/182 |

(Continued)

FOREIGN PATENT DOCUMENTS

DE          39 10 718       10/1990

(Continued)

OTHER PUBLICATIONS

NORDAC Compact Basic: Operating Instructions, BU 5100-99-1D, Jan. 3, 2000, pp. 18, 42.

*Primary Examiner*—Bentsu Ro
*Assistant Examiner*—Antony M Paul
(74) *Attorney, Agent, or Firm*—Michael J. Striker

(57) ABSTRACT

The invention relates to an electric drive (19) provided with a drive regulator (5), an electromotor (9) and a control device (3, 4, 7, 8) which is used to detect and monitor the threshold value of axis-relevant, electrical/mechanical operational state variables, and preventative error diagnosis. The control device (3, 4, 7, 8) comprises an additional monitoring device (6) which can analyze the operational state variables in order to recognize, at an earlier stage, possible deviations from tolerance ranges and to process the analysis results.

12 Claims, 1 Drawing Sheet

U.S. PATENT DOCUMENTS

| | | | |
|---|---|---|---|
| 6,199,018 B1* | 3/2001 | Quist et al. | 702/34 |
| 6,262,550 B1* | 7/2001 | Kliman et al. | 318/565 |
| 6,295,510 B1* | 9/2001 | Discenzo | 702/183 |
| 6,297,742 B1* | 10/2001 | Canada et al. | 340/635 |
| 6,332,116 B1* | 12/2001 | Qian et al. | 702/183 |
| 6,366,862 B1* | 4/2002 | Qian et al. | 702/35 |
| 6,393,373 B1* | 5/2002 | Duyar et al. | 702/115 |
| 6,415,189 B1* | 7/2002 | Hajji | 700/79 |
| 6,427,102 B1* | 7/2002 | Ding | 701/34 |
| 6,484,109 B1* | 11/2002 | Lofall | 702/56 |
| 6,529,135 B1 | 3/2003 | Bowers | |
| 6,560,552 B2* | 5/2003 | Shen et al. | 702/56 |
| 6,640,196 B1* | 10/2003 | Unsworth et al. | 702/115 |
| 6,646,397 B1 | 11/2003 | Discenzo | |
| 6,694,285 B1* | 2/2004 | Choe et al. | 702/182 |
| 6,810,341 B2* | 10/2004 | Qian et al. | 702/75 |
| 6,834,256 B2* | 12/2004 | House et al. | 702/181 |
| 7,010,445 B2* | 3/2006 | Battenberg et al. | 702/77 |
| 7,034,706 B1* | 4/2006 | Nippes | 340/648 |
| 7,127,373 B2* | 10/2006 | House et al. | 702/182 |
| 7,426,099 B2* | 9/2008 | Soudier et al. | 361/23 |
| 2002/0173880 A1 | 11/2002 | Parsadayan | |
| 2005/0240289 A1* | 10/2005 | Hoyte et al. | 700/49 |

FOREIGN PATENT DOCUMENTS

| | | |
|---|---|---|
| DE | 42 21 841 | 1/1993 |
| DE | 196 14 748 | 10/1997 |
| DE | 100 49 506 | 4/2001 |
| DE | 199 61 920 | 7/2001 |
| DE | 101 22 759 | 12/2002 |

* cited by examiner

INTELLIGENT DRIVE

BACKGROUND OF THE INVENTION

The invention deals with electric drives for driving axes within technical processes, according to the preamble of claim 1.

An electric automation system or an electric machine can comprise, in addition to many virtually wear-free electrical components, a large number of mechanical components that are subject to wear, such as gear mechanisms, toothed belts, brakes and guides. Attempts are primarily made to take precautions against the increasing wear by monitoring the characteristic variables that occur during operation. From the prior art, it is therefore known to draw conclusions about the mechanical loading from measured values which are derived from the instantaneous operating state of an electric drive. For instance, the temperature of the windings of an electric motor can be used to detect an increase in load and, if appropriate, to limit the motor current or to switch off the drive. The fault detection is carried out by means of limiting value monitoring or threshold value monitoring.

The disadvantage of these methods is that fault handling only becomes active when the fault has already occurred. The result of this is that the basic mechanical or electrical components may already have been stressed beyond the mark and therefore the wear progresses very quickly, given a frequent repetition of the fault.

Patents DE 196 14 748 C2 and DE 42 21 841 C1 deal with a fault diagnostic method and a monitoring control system for monitoring a plurality of devices. The latter document shows a control device for central monitoring, deviations of the operating data from the monitored devices being detected and processed further. The first-named document shows a relatively complex network with process computer nodes, diagnostic computers, control process computers and a large number of other peripherals for handling faults, specifically for application in electric drive systems as well.

On account of the complexity of the two arrangements, the result is quite complicated and therefore also costly solutions.

SUMMARY OF THE INVENTION

The object of the invention is, then, to provide inexpensive and decentralized preventative fault diagnosis for electric drives, the intention being for the fault diagnosis to ensure the early detection of a looming operative disruption.

The invention is based on an electric drive having a drive controller, an electric motor and a control device with registration and monitoring of the threshold values of axis-relevant, electrical/mechanical operating state variables, the control device comprising additional monitoring with analysis of the operating state variables for the early detection of possible deviations from predefinitions and conditioning of the analytical result. Depending on the operating state variable investigated, the analysis can be carried out continuously and/or intermittently.

The drive can be both a drive incorporated centrally and a drive incorporated decentrally in an operating process, which, by means of a transmission system or directly, transmits the torque from its output drive to axes to be driven. The drive controller or drive amplifier can comprise the current, speed or position control and also a converter or inverter. By means of suitable sensors, the control device monitors the threshold values of the variables required for satisfactory operation, such as the maximum permissible winding temperature and the maximum permissible rotational speed.

The additional monitoring with continuous or intermittent analysis of the operating state variables for the early detection of possible deviations from predefinitions and conditioning of the analytical result ensures axis-specific fault detection. The reason for this is that it is not a higher-order control system (PLC, NC) that performs the analysis but the control device of the drive itself. The transmission of high-frequency changes of operating state variables by means of a bus with restricted bandwidth (e.g. field bus) is dispensed with, since in recent times high-performance and inexpensive CPUs have become obtainable in order to implement the powerful control device directly in the drive. This control device processes the quantity of data immediately after its registration and passes only the result of the data analysis on to the next higher instances via a bus. This firstly saves bandwidth and relieves the load on the CPU of the process control system.

The fact that the additional monitoring is active independent of the threshold value monitoring (for example in parallel therewith), means that looming faults are detected even before the threshold value monitoring reacts. Proactive monitoring is therefore ensured, which is able to avoid the threshold value monitoring responding and an associated failure of the process by means of suitable messages and associated countermeasures. An early reaction by the operating personnel or the control system, for example in the event of bearing damage, reduced rigidity, increased friction, increased play, load fluctuations, lack of freedom of movement, jamming and contamination, is therefore possible. Of course, further electrical and/or mechanical faults on the drive side or the output drive side can be registered by the additional monitoring. All the measured values registered are supplied to the analytical device and analyzed as needed.

In the event of temporary high deviations of the registered movement state variables from the permissible values, the analytical device of the additional monitoring can make an initial decision, for example on the basis of statistical methods, as to whether a response of the threshold value monitoring is necessary or whether this is only a short-term threshold value violation which is not damaging to the arrangement. This reduces unnecessary stoppages and reduces expensive production failures.

The invention thus makes it possible for all the axis-based diagnostic procedures to be accomplished decentrally in the drive to the greatest possible extent. Machine-based diagnoses, on the other hand, can be carried out in the control system, taking into account the axis-based diagnostic messages.

The operating state variables registered by means of electrical signals from sensors are preferably subjected to signal conditioning, in particular by means of a signal filter, before the threshold value monitoring. This avoids false alarms as a result of distorted measured values or those afflicted with interfering variables, which the threshold value monitoring would detect as detected faults. The sensors can be sensors for registering movement-relevant states (acceleration, speed) but also non-movement-relevant states, such as structure-borne sound waves or static loads.

Particularly preferably, the electrical signals of the operating state variables registered by means of sensors are analyzed in the time and/or frequency domain by the additional monitoring. For the purpose of analysis, inter alia, it is possible to use FFT (fast Fourier transformation), CCF (cross-correlation function), ACF (auto-correlation function). If, for example, the actual current value of a motor which drives an axle by means of a belt is analyzed by transforming the current waveform into the frequency domain by means of FFT, then it is possible for conclusions to be drawn about resonant oscillations which are newly forming, on the basis of changing mechanical resonant frequencies as compared with reference values. These new resonant oscillations can be attributed to a reduction in the belt tension, which is notified appropriately to the operator. This notification is carried out long before the belt can slip off or break, so that early fault detection is ensured in any case.

Quite particularly preferably, the predefinitions can be recorded by the drive and stored in the drive as reference values. Application-specific desired values with registration of boundary parameters such as frictional relationships, transmission ratios through gearboxes and tolerance bands for each operating parameter can therefore be stored in the drive. Progressive wear of components can be forestalled by comparing the actual values with the reference values in the time and/or frequency domain.

Quite particularly preferably, the analysis comprises long-term monitoring of operating state variables. In particular, long-term monitoring including tolerance bands and limiting values. Therefore, error messages arising from short-term load fluctuations are avoided. Statistical evaluations, such as averaging, permit evaluation of the trend of a measured variable, error messages being output only when the tolerances are exceeded by the average. A false alarm as a result of excessively early response of the threshold value monitoring can therefore be avoided.

Error messages associated with the operating state variables are expediently generated. Thus, an unambiguous conclusion about the cause of a fault with detailed fault analysis and, if appropriate, hints relating to eliminating the fault are ensured without highly qualified specialist personnel being required to evaluate the fault description. This is therefore again associated with potential savings in the personnel costs for operating personnel.

If the operating state variables are variables registering movement, such as an indication of the angle in order to register the motor shaft position, or the motor rotational speed, and/or variables associated indirectly with the movement, such as the level of the motor winding temperature, the magnitude of the motor current or the level of the intermediate circuit voltage, then the analysis substantially comprises only the evaluation of the measured values which are present in any case in a drive system formed from servomotors. Thus, no additional sensors are required for registering further state data. From the measured value for the motor current in conjunction with the measured value for the motor rotational speed, for example, it is possible to draw conclusions about increased friction when driving a load without additional sensors. With additional sensors, such as strain gages, force measuring capsules, structure-borne sound sensors and acceleration sensors, the diagnostic possibilities and the operating convenience may be increased further as required.

If the analytical results are displayed by means of an operating device comprised by the drive or one connected to the drive (display device with or without input device), then decentralized fault handling is possible directly at the fault source. By means of wire-free interfaces, it is also possible for portable displays or PDAs, laptops, etc. to be used for fault display and/or fault rectification.

A drive according to the invention is advantageously incorporated within at least one technical process and communicates with at least one computer, the drive being linked to the computer by means of a data bus or field bus and in particular reporting the analytical results to said computer.

This permits a possible choice between decentralized and/ or central fault handling and a combination thereof. Complex applications comprising a plurality of drives can therefore be implemented. A modular structure is possible and the comprehensible topology which results therefrom makes the handling and maintenance of the system easier. Suitable as the data bus are all the field buses known in the prior art; in addition fast Ethernet and SERCOS. Faults relating to mechanical and electrical components of the drive should preferably be registered, conditioned and evaluated in the drive itself. Faults which relate to a device driven by means of the drive (for example a tool) should be registered and conditioned in the drive. However, these faults should preferably then be evaluated by the control system since it may be possible for the diagnostic results of further drives to be needed for the fault detection. The same applies to faults in conjunction with a workpiece or object currently being machined or processed by the process. Therefore, when a fault impairs a plurality of drives or could be caused by a plurality of drives, the computer (assembly) should therefore always participate in the diagnosis as a higher-order instance. It can register all the error messages from all the drives, evaluate them and generate statistics and also automatically initiate measures for fault rectification or inform the operating personnel.

If the drive can be freely programmed and/or configured, at least with respect to the fault detection, this permits flexible adaptation of the fault detection to the operating environment or the application to be implemented. Functions that are not needed can be deactivated in order to save computing power. The programming interface can be configured in such a way that it is not necessary to pass on internal drive structures to the user; thus the interest of the manufacturer in not having to pass on any internals is preserved.

If the analytical results can be retrieved within the context of remote maintenance, this makes the automatic monitoring of a process easier. Axis-specific faults can be retrieved, for example given additional transmission of a drive or axis address, and easily detected on the basis of the additional information. Appropriate specialist personnel are thus rapidly and easily allocated, and necessary spare parts can be ordered independently of a site inspection.

LIST OF DESIGNATIONS

1 Man/machine interface
2 (Central) computer
3 Message generation
4 Protective device
5 Drive controller
6 Additional monitoring
7 Limiting value/threshold value monitoring
8 Measured value registration
9 Motor
10 Drive

DETAILED DESCRIPTION OF THE PREFERRED EMBODIMENTS

Figure 1:
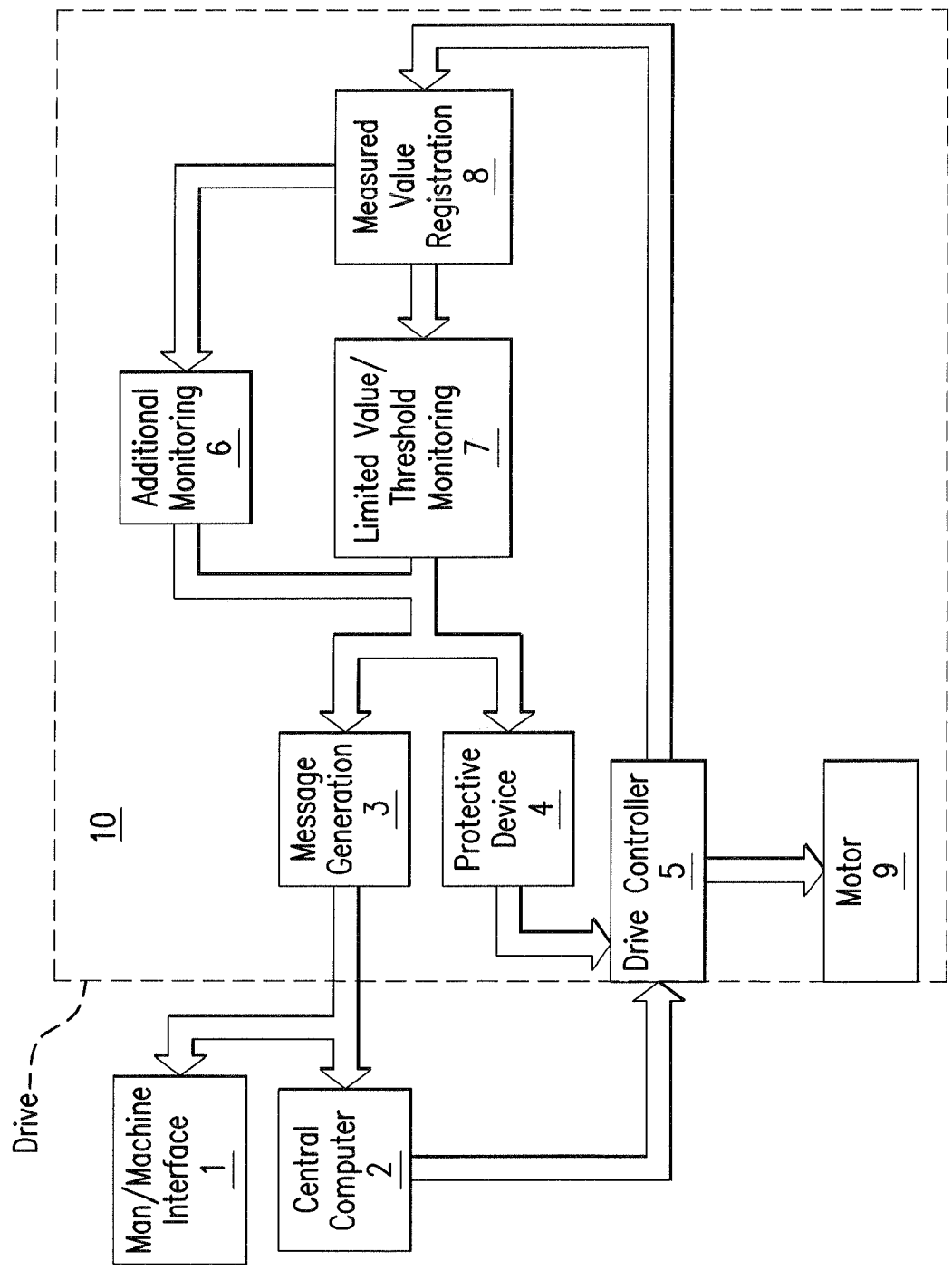
FIG. 1 is a schematic diagram of the device according to the present invention.

In the following text, a device having the solution according to the invention is to be shown by using FIG. 1. FIG. 1 contains a man/machine interface 1, a computer/computer assembly 2, message generation 3, a protective device 4, a drive controller 5, additional monitoring 6, limiting value/ threshold value monitoring 7, measured value registration 8, a motor 9. In this case, the designations 3 to 9 form the drive 10, the designations 1 and 2 external components.

The electric drive 10 with drive controller 5, electric motor 9 and a control device (3 to 8) can be used for example for driving a circulating ball spindle of a machine tool. The control device comprises monitoring 6 according to the invention in addition to the limiting value/threshold value monitoring 7. Both monitoring units 7, 6 obtain the measured values to be monitored from the measured value registration 8. These can be, for example, measured values for registering the rotational speed of the motor shaft, the pulses from a rotary encoder, measured values for registering the motor current and the measured winding temperature. The measured values can be present in analog and/or in digital form. While the for limiting value/threshold value monitoring 7 is restricted to the compliance with predefined limiting values, additional monitoring 6 is performed, the registered measured values being evaluated and interpreted by means of continuous or intermittent analysis for the early detection of possible deviations from predefinitions. This is then followed by detailed conditioning of the analytical result, so that the cause of a looming fault, such as a loose drive belt, increased friction, bearing damage, increased play, reduced rigidity, load fluctuations, lack of freedom of movement, jamming, contamination of the axis mechanism, bearing damage, can be reported to the operating unit 1 and/or the control system 2 by means of the message generation 3 in the form of detailed error or fault messages and/or warnings, so that an operator can arrange for fault rectification, even without accurate system knowledge. This applies in particular to the case in which, in addition to the reporting, it is also possible to call up hints as to what steps should be initiated in order to eliminate the fault. It would also be conceivable to integrate the components 2 and 1 into the drive if the application is suitable for this purpose and adequate computing power and space are available.

Following the measured value registration 8, the electrical signals registered can be subjected to signal conditioning before they are fed to the threshold value monitoring 7, for example. This is then used to mask out short-term faults on the signal lines, for example caused by high magnetic fields, and to avoid an error message in the event of an associated threshold value violation. Undesired process failures are ultimately avoided in this way.

The additional monitoring 6 can be configured in various ways, so that the electrical signals of the operating state variables registered by means of sensors are analyzed in the time and/or frequency domain. For example, an analysis in the frequency domain could comprise fast Fourier transformation (FFT), in order to make it possible to find undesired resonant oscillations. Likewise, an auto-correlation function (ACF) could be used in order to establish the rate at which the measured values change on average over time. Further analytical methods by means of mathematical methods, such as setting up a cross-correlation function (CCF), etc., are conceivable and limited only by the computing capacity in the drive.

The additional monitoring 6 will generally comprise a data storage means which is used for storing desired values, which are recorded by the drive as reference values, for example during an initialization or homing phase with a real load, and can be used as orientation variables during the analysis.

The analysis of the additional monitoring 6 can also comprise long-term monitoring of individual measured values. For example, the intermediate circuit voltage and the motor current could be used to calculate the average power.

Each measured value or specific measured value combinations can be assigned error messages, which then contribute to the elimination of a fault when one is detected.

The invention claimed is:

1. An electric drive (10), comprising:
   a drive controller (5);
   an electric motor (9); and
   a control device (3, 4, 7, 8) configured to register and monitor threshold values of axis-based, electrical/mechanical operating state variables,
   wherein the control device (3, 4, 7, 8) comprises additional monitoring (6) with analysis of the operating state variables for the early detection of possible deviations from predefinitions and conditioning of the analytical result, wherein the additional monitoring is active independently of the monitoring of the threshold values, such that said possible deviations from predefinitions and conditioning of the analytical result are detectable before the monitoring of the threshold values.

2. The device according to claim 1, wherein the operating state variables registered by means of electrical signals from sensors are subjected to signal conditioning by means of a signal filter.

3. The device according to claim 1, wherein the electrical signals of the operating state variables registered by means of sensors are analyzed in the time and/or frequency domain.

4. The device according to claim 2, wherein the sensors register movement-relevant and/or non-movement-relevant operating state variables.

5. The device according to claim 1, wherein the predefinitions are recorded by the drive and stored in the drive as reference values.

6. The device according to claim 1, wherein the analysis comprises long-term monitoring of operating state variables.

7. The device according to claim 1, wherein the conditioning generates fault messages assigned to the operating state variables.

8. The device according to claim 1, wherein the operating state variables comprise the axis position and/or the rotational speed and/or the motor winding temperature and/or the magnitude of the motor current and/or the level of the intermediate circuit voltage and/or acoustic signals such as structure-borne sound waves and/or the acceleration.

9. The device according to claim 1, wherein the analytical results can be displayed by means of an operating device (1) comprised by the drive or one connected to the drive.

10. The device according to claim 1 wherein the drive is incorporated within at least one technical process and communicates with at least one computer/computer assembly (2).

11. The device according to claim 1, wherein the drive can be freely programmed and/or freely configured, at least with respect to the fault detection.

12. The device according to claim 1, wherein the analytical results can be retrieved within the context of remote maintenance.

* * * * *